L. W. YOUNG.
ART GLASSWARE.
APPLICATION FILED DEC. 30, 1909.
1,041,938.
Patented Oct. 22, 1912.
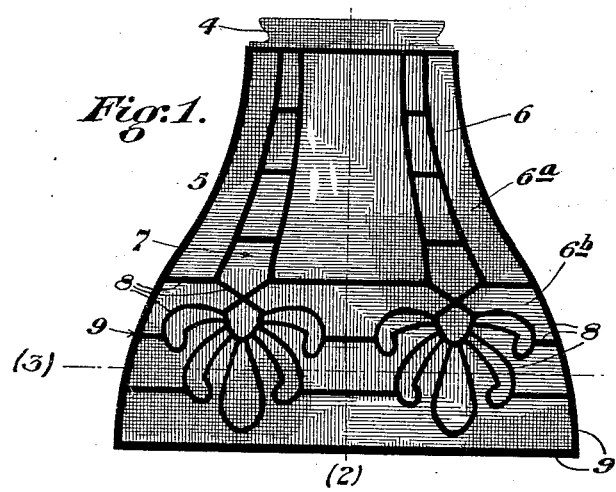
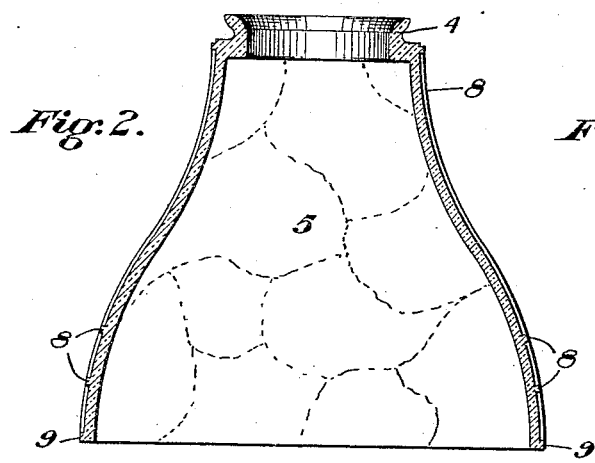
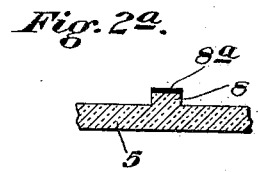
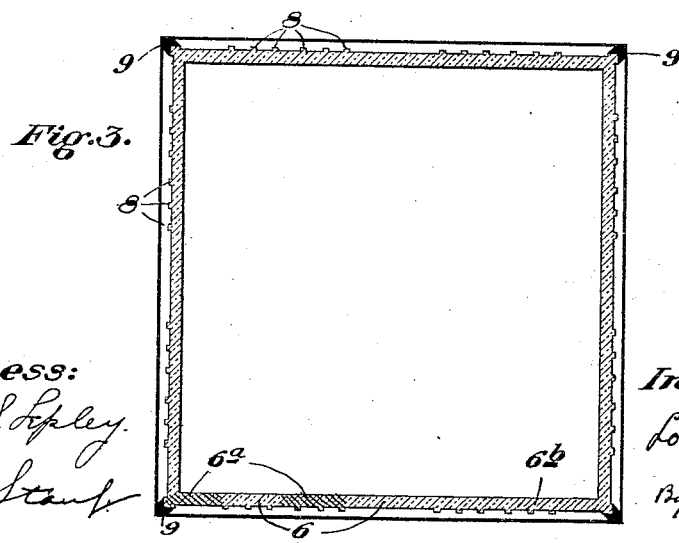
Witness:
Chas. S. Lipley.
F. Staub.
Inventor,
Lorin W. Young
By F. W. H. Clay
his atty.
COLUMBIA PLANOGRAPH CO., WASHINGTON, D. C.

UNITED STATES PATENT OFFICE.

LORIN W. YOUNG, OF PITTSBURGH, PENNSYLVANIA, ASSIGNOR TO MACBETH-EVANS GLASS COMPANY, OF PITTSBURGH, PENNSYLVANIA, A CORPORATION OF PENNSYLVANIA.

ART-GLASSWARE.

1,041,938.  Specification of Letters Patent.  Patented Oct. 22, 1912.

Application filed December 30, 1909. Serial No. 535,706.

*To all whom it may concern:*

Be it known that I, LORIN W. YOUNG, a citizen of the United States, residing at Pittsburgh, in the State of Pennsylvania, have invented certain new and useful Improvements in Art-Glassware, of which the following is a specification.

My invention relates to such articles as ornamental lamp shades, and especially to glass articles made by pressing; the primary objects of the invention being to imitate in an integral article, the appearance of a so-called "art glass"; to divide up the surface of an article made of intermingled colors of glass by dividing ribs, and generally to improve the construction of ornamental glassware.

In the accompanying drawing I show in Figure 1 a side elevation of a lamp shade made according to my invention; Fig. 2 is a central vertical section on the line (2) of Fig. 1, and Fig. 2ª is a partial enlarged section showing the construction of the ribs on the surface. Fig. 3 is a horizontal section on the line (3) of Fig. 1.

It will be understood that my invention is applicable to other uses, though it is here shown as applied to an ornamental lamp shade. It has been customary to make ornamental shades by building up, piece by piece, a form made of various colored glasses, the pieces being leaded together and supported by a metallic frame. Integral ornamental articles have also been made by partially mixing or fusing together various masses of glass of different colors, but these of course do not imitate the art glass and there is no appearance of separate pieces of separate color at all. According to my invention, I make such articles in a press mold of one integral piece, by fusing together a miscellaneous lot of glass of different colors and different degrees of opacity, and provide on the outside surface a series of raised ribs which divide up the surface into areas of any suitable design, whereby the different colored glasses will appear as being separated by leading. Thus in the drawing for illustration, the article consists of a neck 4, and a body 5 made up of various fused masses of glass of different colors, 6, 6ª, and the surface is separated by a series of ribs 8 and a heavier outside rib 9 at the edges and corners. As shown in Fig. 2ª, I then apply to the tops of ribs 8 a layer of black or metallic paint 8ª which is burned into the glass and forms part of the integral article.

As seen in Fig. 2, the various masses of glass of different colors and different degrees of opaqueness are fused together in haphazard fashion just as they chance to come out in pressing the article, but by reason of the raised ribs 8, the outside surface presents the appearance of being built up of separate pieces of glass leaded together. The article then is a very close imitation of the art or leaded glass structure, which result is obtained by reason of the mechanical construction, separating the surface into distinct areas by raised ribs.

In some simple designs, as where the article is to be divided into vertical strips, it will be understood that the different colored glasses may be deposited entirely in separate areas divided off by the raised ribs.

Various advantages of the invention will readily occur to those familiar with the art. For example, a shade in all respects similar in appearance to the expensive art glass, is thus made very cheaply, and moreover the article is far stronger for being made in one integral piece. Almost any design can be made in a mold, requiring but the operation of pressing. Also a division of the surface into separate areas surrounded by walls, renders it easy to apply various kinds of ornamentation, such as sandblasting the surface of some of the separate areas, or applying metallic or other paint thereto, or grinding additional ornaments thereon, or etching with acids, etc. Each of the separate areas may be treated independently of the others, which would be impossible to do without the raised separating rib.

Having thus described my invention, what I claim is the following:

An imitation leaded stained glass lamp shade comprising in one integral piece a shade composed throughout of an indiscriminate mixture of several kinds of glass of varying density and composition and color fused together, said shade having on its outside surface raised integral ribs arranged in regular patterns and opaque paint on the tops of the ribs, whereby to give the appearance of separate pieces of vari-colored art glass leaded together, substantially as described.

In testimony whereof I have hereunto signed my name in the presence of the two subscribed witnesses.

LORIN W. YOUNG.

Witnesses:
F. W. H. CLAY,
CHAS. S. LEPLEY.